(12) United States Patent
Quinn

(10) Patent No.: US 6,845,200 B1
(45) Date of Patent: Jan. 18, 2005

(54) FIBER OPTIC ASSEMBLIES, CABLE, AND MANUFACTURING METHODS THEREFOR

(75) Inventor: Christopher M. Quinn, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 10/692,492

(22) Filed: Oct. 24, 2003

(51) Int. Cl.⁷ .............................................. G02B 6/44
(52) U.S. Cl. ...................................... 385/109; 385/111
(58) Field of Search ................................ 385/105–114

(56) References Cited

U.S. PATENT DOCUMENTS

| | | | |
|---|---|---|---|
| 4,707,569 A | 11/1987 | Yoshimura et al. | 174/116 |
| 4,867,526 A | 9/1989 | Arroyo | 350/96.23 |
| 4,909,592 A | 3/1990 | Arroyo et al. | 350/96.23 |
| 4,913,517 A | 4/1990 | Arroyo et al. | 350/96.23 |
| 5,157,752 A | 10/1992 | Greveling et al. | 385/112 |
| 5,345,526 A | 9/1994 | Blew | 385/112 |
| 5,384,880 A | 1/1995 | Keller et al. | 385/109 |
| 5,630,003 A | 5/1997 | Arroyo | 385/113 |
| 5,642,452 A | 6/1997 | Gravely et al. | 385/113 |
| 5,684,904 A | 11/1997 | Bringuier et al. | 385/109 |
| 6,205,277 B1 | 3/2001 | Mathis et al. | 385/106 |
| 6,226,431 B1 | 5/2001 | Brown et al. | 385/114 |
| 6,229,944 B1 | 5/2001 | Yokokawa et al. | 385/114 |
| 6,317,543 B1 | 11/2001 | Sheu | 385/114 |
| 6,321,012 B1 | 11/2001 | Shen | 385/106 |
| 6,519,399 B2 * | 2/2003 | Strong et al. | 385/114 |
| 6,546,175 B1 * | 4/2003 | Wagman et al. | 385/113 |
| 6,714,710 B2 * | 3/2004 | Gimblet | 385/113 |
| 6,778,745 B2 * | 8/2004 | Debban et al. | 385/114 |
| 6,785,450 B2 * | 8/2004 | Wagman et al. | 385/100 |

FOREIGN PATENT DOCUMENTS

| | | | |
|---|---|---|---|
| JP | 2001-343565 | 12/2001 | G02B/6/44 |
| JP | 2001-343566 | 12/2001 | G02B/6/44 |

OTHER PUBLICATIONS

Patrick Van Vickle, et al., "Innovative Dry Buffer Tube Design For Central Tube Ribbon Cable", 2001.
U.S. patent Publication No. 2003/0108309A1, published Jun. 12, 2003.
U.S. patent Publication No. 2003/0108310A1, published Jun. 12, 2003.

* cited by examiner

*Primary Examiner*—Chandrika Prasad
(74) *Attorney, Agent, or Firm*—Michael E. Carroll, Jr.

(57) ABSTRACT

An optical assembly and methods of manufacturing the same include a longitudinal cavity, at least one optical waveguide being disposed in the longitudinal cavity having a predetermined length, and at least one water-swellable yarn being disposed within the longitudinal cavity and having a predetermined length. The predetermined length of the at least one water-swellable yarn being greater than the predetermined length of the at least one optical waveguide. The at least one water-swellable yarn is disposed longitudinally relative to the at least one optical waveguide so that the at least one water-swellable yarn and the at least one optical waveguide generally act as independent bodies within the longitudinal cavity.

52 Claims, 3 Drawing Sheets

FIBER OPTIC ASSEMBLIES, CABLE, AND MANUFACTURING METHODS THEREFOR

FIELD OF THE INVENTION

The present invention relates generally to dry packaging of optical waveguides. More specifically, in one embodiment the invention relates to optical assemblies, cables, and manufacturing methods therefor with a water-swellable yarn having a predetermined length that is longer than the optical fiber predetermined length and is disposed longitudinally relative to the at least one optical waveguide. This construction allows the at least one water-swellable yarn and the at least one optical waveguide to generally act as independent bodies within the tube.

BACKGROUND OF THE INVENTION

Fiber optic cables include optical waveguides such as optical fibers that transmit optical signals, for example, voice, video, and/or data information. One type of fiber optic cable configuration includes optical waveguides disposed within a tube, thereby forming a tube assembly. Generally speaking, the tube protects the optical waveguides; however, the tube assembly must also meet other performance requirements. Consequently, conventional tube assemblies filled the tube with a thixotropic grease for meeting the necessary performance requirements.

Specifically, the thixotropic grease allowed the optical waveguides to have some relative movement between the optical waveguides and the tube to accommodate bending. Additionally, the thixotropic grease adequately couples the optical waveguides with the tube, thereby inhibiting the optical waveguides from being displaced within the tube when, for example, pulling forces are applied to install the cable. The thixotropic grease also inhibited the migration of water therein. Furthermore, the type of thixotropic grease was carefully selected since the tube assembly generally required operation over a range of temperatures without undue optical performance degradation due to viscosity changes in the thixotropic grease.

Although, the thixotropic grease worked well it had several drawbacks. First, the thixotropic grease was messy and required cleaning from the optical fiber before connectorization. Removing the thixotropic grease was time consuming and requires the craftsman to carry the necessary cleaning materials and supplies. Additionally, the thixotropic grease changes viscosity with temperature and with elevated temperatures it may flow out of the end of the cable. Several cable designs have attempted to remove the thixotropic grease, but with limited success since the thixotropic grease served several distinct functions.

SUMMARY OF THE INVENTION

The present invention is directed to a fiber optic cable including at least one optical waveguide having a predetermined length and at least one water-swellable yarn having a predetermined length. The predetermined length of the at least one water-swellable yarn being greater than the predetermined length of the at least one optical waveguide. Additionally, the at least one water-swellable yarn is disposed longitudinally relative to the at least one optical waveguide so that the at least one water-swellable yarn and the at least one optical waveguide generally act as independent bodies within a common longitudinal cavity.

The present invention is also directed to an optical tube assembly including a tube, at least one optical waveguide having a predetermined length disposed in the tube, and at least one water-swellable yarn having a predetermined length which is disposed within the tube. The predetermined length of the at least one water-swellable yarn being greater than the predetermined length of the at least one optical waveguide. Additionally, the at least one water-swellable yarn is disposed longitudinally relative to the at least one optical waveguide so that the at least one water-swellable yarn and the at least one optical waveguide generally act as independent bodies within the tube.

The present invention is further directed to an optical tube assembly including a tube, at least one optical waveguide having a predetermined length disposed in the tube, a lubricant disposed on a portion of the at least one optical waveguide, and at least one water-swellable yarn having a predetermined length disposed within the tube. The predetermined length of the at least one water-swellable yarn being at least about 0.05% longer than the predetermined length of the at least one optical waveguide. Additionally, the at least one water-swellable yarn is disposed longitudinally relative to the at least one optical waveguide so that the at least one water-swellable yarn and the at least one optical waveguide generally act as independent bodies within the tube.

The present invention is still further directed to a fiber optic cable including a central member, a tube being stranded about the central member, at least one optical waveguide having a predetermined length disposed in the tube, and at least one water-swellable yarn having a predetermined length disposed within the tube. The predetermined length of the at least one water-swellable yarn being greater than the predetermined length of the at least one optical waveguide. Additionally, the at least one water-swellable yarn is disposed longitudinally relative to the at least one optical waveguide so that the at least one water-swellable yarn and the at least one optical waveguide generally act as independent bodies within the tube.

The present invention is also directed to a method of making a fiber optic tube assembly, including the steps of: paying off at least one optical waveguide with a predetermined length, paying off at least one water-swellable yarn with a predetermined length, maintaining the predetermined length of the at least one water-swellable yarn so that its predetermined length is greater than the predetermined length of the at least one optical waveguide, and extruding a tube about the at least one optical waveguide and the at least one water-swellable yarn. The at least one water-swellable yarn is disposed longitudinally relative to the at least one optical waveguide so that the at least one water-swellable yarn and the at least one optical waveguide are able to act as independent bodies within the tube.

Additionally, the present invention is directed to a fiber optic cable including at least one optical waveguide, a lubricant disposed on a portion of the at least one optical waveguide, and at least one water-swellable yarn having a denier of about 5000 or less. The water-swellable yarn includes at least two filaments that are stranded together with at least one of the two filaments being a water-swellable filament. The at least one water-swellable yarn is disposed longitudinally relative to the at least one optical waveguide so that the at least one water-swellable yarn and the at least one optical waveguide generally act as independent bodies within a common longitudinal cavity.

DETAILED DESCRIPTION OF THE INVENTION

The present invention will now be described more fully hereinafter with reference to the accompanying drawings showing preferred embodiments of the invention. The invention may, however, be embodied in many different forms and should not be construed as limited to the embodiments set forth herein; rather, these embodiments are provided so that the disclosure will fully convey the scope of the invention to those skilled in the art. The drawings are not necessarily drawn to scale but are configured to clearly illustrate the invention.

Figure 1:
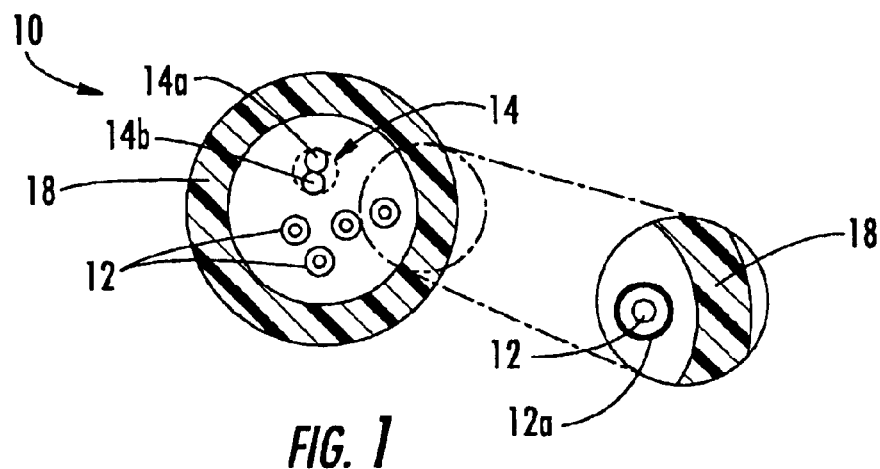
FIG. 1 is a cross-sectional view of a tube assembly according to the present invention.
Figure 2:
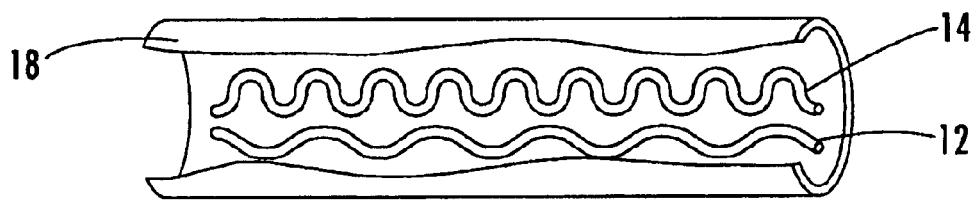
FIG. 2 is a cutaway longitudinal schematic view of a tube assembly illustrating concepts according to the present invention.

Illustrated in FIG. 1 is an exemplary tube assembly 10 according to one aspect of the present invention. Tube assembly 10 includes at least one optical waveguide 12 having a predetermined length, at least one water-swellable yarn 14 having a predetermined length, and a tube 18. The predetermined length of water-swellable yarn 14 is greater than the predetermined length of optical waveguide 12 as schematically depicted in FIG. 2. Additionally, the at least one water-swellable yarn 14 is disposed longitudinally relative to the at least one optical waveguide 12 so that water-swellable yarn 14 and optical waveguide 12 generally act as independent bodies within a longitudinal cavity such as tube 18. As used herein, disposed longitudinally relative to the optical waveguide means that the water-swellable yarn is neither wrapped around or generally intertwined with the at least one optical waveguide; however, the optical waveguide 12 and water-swellable yarn 14 may contact and/or cross each other within the longitudinal cavity. Additionally, embodiments of the present invention may also include a lubricant 12a on nearly all or a portion of optical waveguide 12.

Generally speaking, the at least one optical waveguide 12 and the at least one water-swellable yarn 14 of tube assembly 10 act as independent bodies within tube 18. For instance, during bending of tube assembly 10 the water-swellable yarn will generally not exert appreciable forces on the optical waveguide that would cause undesirable optical attenuation. This is because the water-swellable yarn has longer length than the optical waveguide and is disposed longitudinally with respect to the optical waveguide.

On the other hand, if the water-swellable yarn were wrapped helically around one or more optical fibers the bending of the tube assembly may cause the water-swellable yarn to tighten upon the optical fiber(s) during bending, which may cause undesirable optical attenuation. Likewise, if the water-swellable yarn were intertwined with the optical fiber(s) it may cause undesired optical attenuation during bending. Additionally, if optical waveguide 12 is longer than water-swellable yarn 14 it may cause undesirable optical attenuation. Specifically, because the yarn is shorter it experiences tension first, i.e., the excess length is taken up first, and pulls/applies forces to the optical waveguide, thereby causing undesired optical attenuation. However, the concepts of the present invention overcome this problem by using a longitudinally disposed water-swellable yarn 14 with a predetermined length that is longer than the predetermined length of optical waveguide 12.

Optical waveguides 12 are depicted as loose optical fibers, but optical waveguide 12 may have other suitable configurations such as ribbonized (FIG. 3), bundled, and/or buffered. Additionally, other types or configurations of optical waveguides can be used. For example, optical waveguide 12 can be single-mode, multi-mode, pure-mode, erbium doped, polarization-maintaining fiber, or other suitable types of light waveguides. Each optical waveguide 12 may include a silica-based core that is operative to transmit light and is surrounded by a silica-based cladding having a lower index of refraction than the core. Additionally, one or more coatings can be applied to optical waveguide 12. For example, a soft primary coating surrounds the cladding, and a relatively rigid secondary coating surrounds the primary coating. Optical waveguide 12 can also include an identifying means such as ink or other suitable indicia for identification. Suitable optical waveguides 12 are commercially available from Corning Incorporated of Corning, N.Y.

In preferred embodiments, optical waveguide 12 has a predetermined length that is equal to or longer than the length of tube 18. However, the predetermined length of optical waveguide 12 may be slightly shorter than the length of tube 18. The length of the optical waveguide may be compared with the length of the tube by taking a suitable length of tube assembly 10, for instance, about 1000 centimeters and measuring the lengths of both the tube and the optical waveguide. Thereafter, the length of the optical waveguide is divided by the length of the tube minus one and multiplied by to determine a length percent difference. By way of example, a tube assembly with a length of 1000 centimeters has an optical waveguide with a length of 1001.5 centimeters, thereby yielding a 0.15% optical waveguide overlength. Likewise, in a similar manner the length of water-swellable yarn 14 can be compared with the length of optical waveguide 12.

In other embodiments, optical waveguide 12 has a lubricant 12a disposed on at least a portion thereof, but it may be disposed over a majority of the optical waveguide surface area. Suitable lubricants include a silicone oil, a polyalphaolefin (PAO), or mineral oil. However, other suitable lubricants may be used such as waxes, surfactants such as soap, or glycols such as propylene glycol. Lubricant 12a serves to aid the optical fibers in shifting/migrating when, for example, tube assembly 10 is bent, thereby inhibiting optical attenuation. Additionally, lubricant 12a also provides a degree of coupling between the optical waveguides and the tube through surface tension between the lubricant and the tube wall. Although, optical waveguides 12 may include a lubricant thereon, tube 18 generally is not filled with thixotropic grease, thereby making tube assembly 10 a dry tube assembly.

Water-swellable yarn 14 has a predetermined length that is greater than the predetermined length of optical waveguide 12. Additionally, water-swellable yarn 14 is disposed longitudinally with respect to optical waveguide 12 so they generally act as independent bodies within the tube as discussed, thereby inhibiting optical attenuation. In preferred embodiments, water-swellable yarn 14 is at least about 0.05% longer than optical waveguide 12, more preferably about 0.1% longer than optical waveguide 12. Other suitable overlength dimensions are also possible for water-swellable yarn 14 such as 0.2%, or 0.3%, longer than optical waveguide 12. However, too much overlength may cause undesired optical attenuation because the points of contact between the two bodies increase to a point where the bodies no longer act like independent bodies.

Additionally, in preferred embodiments water-swellable yarn 14 has a denier of about 5000 or less and comprises at least two filaments 14a, 14b that are stranded together. Moreover, both filaments 14a or 14b may carry the water-swellable substance, but in preferred embodiments only one of the filaments carries the water-swellable substance. For instance, a first filament includes the water-swellable substance and the second filament is a polyester filament without a water-swellable substance. Of course, other suitable second filament materials are possible such as cotton, polyethylene, nylon, polypropylene, fiberglass, polyphenylenebenzobisozazole (PBO), polybenzimidazole (PBI), and aramid.

Preferably, the stranded water-swellable yarn 14 has about ten twists per inch (TPI) or less during a no-load condition and most preferably about seven or less TPI. In other words, the TPI is about 10 or less when the stranded water-swellable yarn 14 is in a relaxed state. More preferred embodiments employ water-swellable yarn 14 having a denier of about 2500 or less. Additionally, embodiments can include more than one water-swellable yarn 14 in the tube assembly and/or the water-swellable yarns 14 may have one or more different configurations. Additionally, other suitable embodiments of the present invention can use a single unstranded filament of water-swellable yarn 14.

Water-swellable yarn 14 also aids in coupling optical waveguide 12 with tube 18, thereby inhibiting relatively large migrations of optical waveguide 12 along tube 18. Relatively large migrations of optical fiber 12 can cause problems such as stress and/or strain on the optical waveguide that can cause optical attenuation and/or optical fibers being pulled out of optical connectors. Additionally, water-swellable yarn 14 advantageously inhibits the migration of water along tube 18. In preferred embodiments, tube assembly 10 has a water penetration length of less than about one meter using industry testing. Furthermore, the water-swelling substance of water-swellable yarn 14 should generally refrain from using relatively large and hard particles that may cause point stresses and/or strains, thereby causing undesirable optical attenuation in the optical waveguides.

Tube 18 may be formed from any suitable polymeric material such as polyethylene, polypropylene, polybutylteraphalate (PBT), polyvinylchloride (PVC), or the like. Additionally, the polymeric material of tube 18 can include any suitable additives such as flame-retardants and/or fillers for reducing the post extrusion tube shrinkage. In other embodiments, tube 18 can be formed from a bimodal polymeric material as discussed in U.S. patent application Ser. No. 10/448,509 filed on May 30, 2003, the disclosure of which is incorporated herein by reference. Using a bimodal material that is produced in a dual-reactor process for tube 18 helps maintain the intended tube shape during manufacture since the tube is not filled with thixotropic grease. Additionally, tube 18 may include one or more strength members (not shown) within the tube wall. Suitable strength members include tensile members lacking appreciable anti-buckling strength such as aramid fibers, fiberglass yarns and the like and/or rigid strength members such as metal wires or glass reinforced plastics (GRPs).

Figure 3:
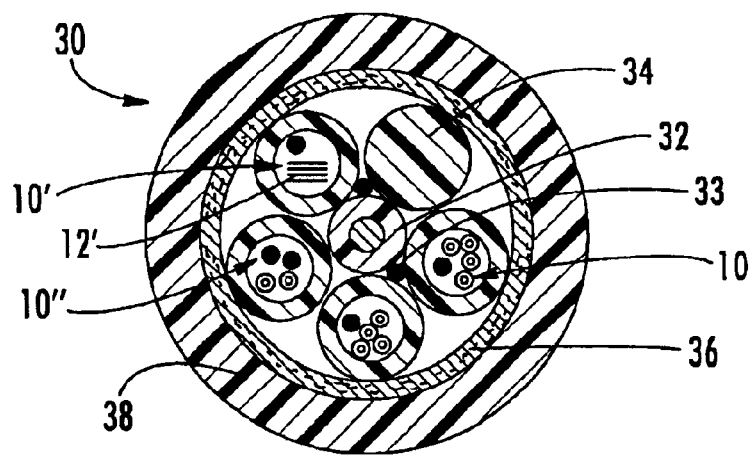
FIG. 3 is a cross-sectional view of a fiber optic cable using the tube assembly of FIG. 1.

FIG. 3 depicts an explanatory fiber optic cable 30 having a plurality of tube assemblies 10, 10', and 10" and a filler rod 34 stranded about a central member 32. Cable 30 includes several different tube assembly embodiments. Specifically, tube assembly 10' includes at least one fiber optic ribbon 12' having a predetermined ribbon length that is less than the predetermined length of the at least one water-swellable yarn 14. Tube assembly 10" includes more than one water-swellable yarn 14 disposed within the tube. Moreover, other suitable tube assemblies employing the concepts of the present invention are possible such as a water-swellable yarn and a bundle of optical waveguides within the tube.

In cable 30, central member 32 is a steel wire overcoated with a polymeric material to a suitable outer diameter. However, other suitable central members may be used such as a glass reinforced plastic (GRP), an aramid yarn, or the like. Around central member 32 is stranded at least one water-swellable element such as yarn 33, but a water-swellable tape, coating, or powder may be used to block the migration of water near the center of cable 30. As shown, cable 30 may also include one or more filler rods 34 to replace one or more tube assemblies or for providing crush resistance for cable 30. Cable 30 also includes a first binder thread (not visible) for holding the stranded tube assembly together, a water-swellable tape 36 wrapped about the stranded tube assembly held by a second binder thread, and a jacket 38. Other embodiments of cable 30 can include other suitable cable components such as armor, other strength members, and/or electrical conductors. Additionally, tube assemblies according to the present invention are suitable for use with other fiber optic cable configurations.

Figure 4:
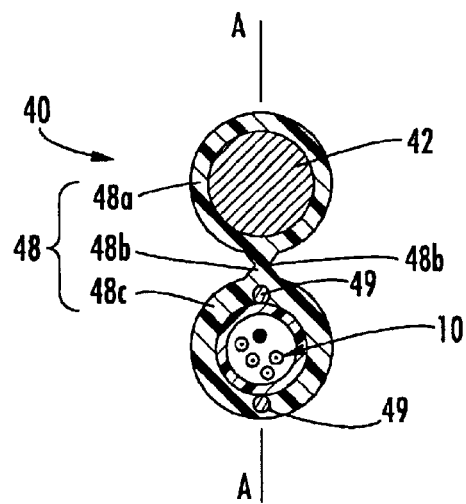
FIG. 4 is a cross-sectional view of another fiber optic cable using the tube assembly of FIG. 1.

For instance, FIG. 4 depicts a fiber optic cable 40, which is suitable for drop/access applications. Cable 40 includes a messenger section having at least one strength member 42, a carrier section having tube assembly 10, and a jacket 48. Jacket 48 includes a part of a messenger jacket 48a and a part of a carrier jacket 48b connected by a web 48c in a figure eight design. Additionally, web 48c has a preferential tear portion 48d, thereby allowing for easy and reliable separation of carrier and messenger sections.

In one embodiment, strength member 42, or other drop cable strength members, are a solid metallic material such as steel having a relatively low bend energy and good memory shape. This strength member may be bent into a relatively tight radius so that it may function as a tie down as discussed in the U.S. Pat. App. titled "Fiber Optic Cable Having a Strength Member" filed on Jul. 18, 2003 by Mohler et al., the disclosure of which is incorporated herein by reference. Thus, the strength member is suitable, if necessary, for self-attaching to studs, hooks, or the like without the added expense and labor of clamps and/or other hardware, yet it is still suitable for such hardware. The strength member may also be annealed to relieve work hardening. In another embodiment, the strength member has a carbon content between about 0.30 percent to about 0.75 percent. A coating may also be applied to the strength member. For instance, suitable coatings include zinc-based or polymer coatings for environmental/corrosion protection, a copper coating for conductivity; however, other suitable coating(s) may be useful.

Furthermore, cable 40 can have one or more strength members 49. The one or more strength members 49 are generally positioned in a reference plane A—A that extends through the messenger section, the carrier section, and the web as discussed in U.S. Pat. No. 6,356,690, the disclosure of which is incorporated herein by reference. In other embodiments, the strength members 49 may be eliminated from the carrier section as discussed in U.S. Pat. No. 6,546,175, the disclosure of which is incorporated herein by reference.

Figure 5:
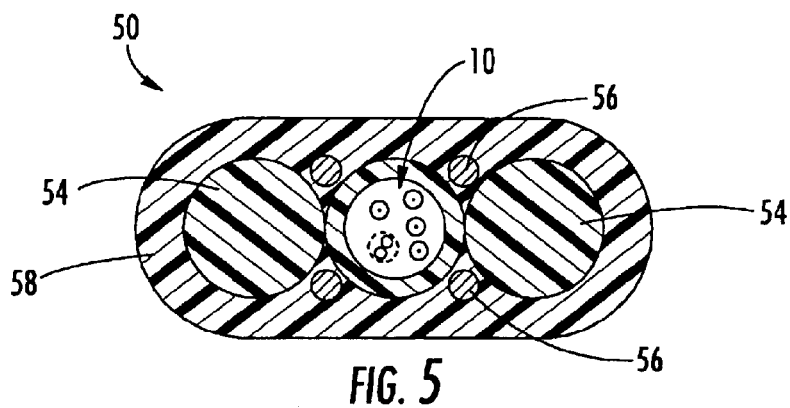
FIG. 5 is a cross-sectional view of another fiber optic cable using the tube assembly of FIG. 1.

Additionally, drop/access fiber optic cables may have other configurations. Specifically, FIG. 5 depicts fiber optic cable 50 having tube assembly 10, at least one strength member 54, at least one tensile strength component 56, and jacket 58 as disclosed in U.S. Pat. No. 6,542,674, the disclosure of which is incorporated herein by reference. The use of the rigid strength member 54 and a tensile strength component 56 allows cable to provide the necessary tensile and anti-buckling strength, while still remaining relatively flexible. Cable 50 is generally flat but can have other shapes or configurations as well.

Figure 6:
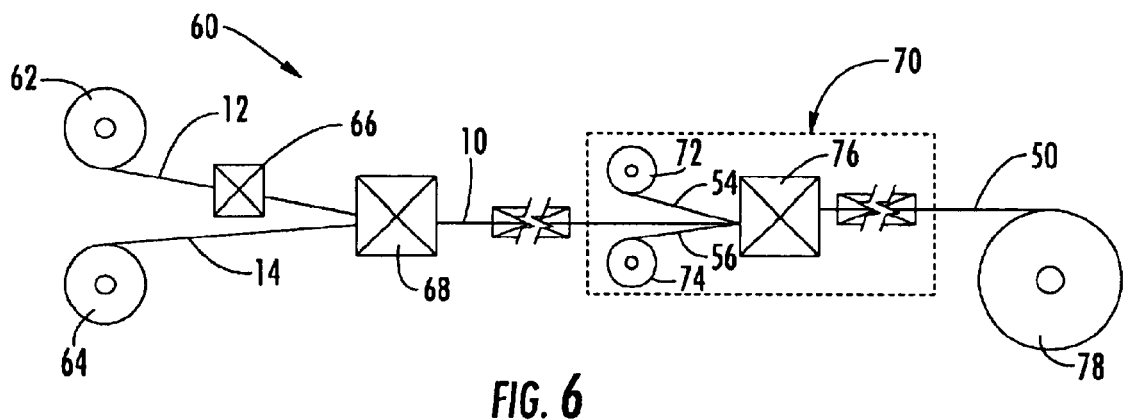
FIG. 6 is a schematic representation of a manufacturing line for making the tube assembly of FIG. 1 and the fiber optic cable of FIG. 5.

FIG. 6 schematically illustrates an exemplary manufacturing line 60 for making optical tube assembly 10 and/or fiber optic cable 50. The manufacturing method includes the steps of paying-off at least one optical waveguide 12 and at least one water-swellable yarn from a pair of respective spools 62 and 64. Although, optical tube assembly 10 and fiber optic cable include a plurality of optical waveguides 12 for the sake of simplicity only one optical waveguide is illustrated being paid-off. Likewise, if more than one water-swellable yarn individual spools would be used for paying-off each water-swellable yarn. Thereafter, an optional lubrication station 66 applies lubricant 12a to at least a portion of optical waveguide 12. Next, optical waveguide 12 and water-swellable yarn 14 are feed into a cross-head extruder 68 for forming tube 18 therearound, thereby forming optical tube assembly 10 at the exit. During this process, the predetermined length of the water-swellable yarn is controlled so that its predetermined length is greater than the predetermined length of optical waveguide 12. Optical tube assembly 10 is then run through a water trough (not numbered) for cooling the extruded tube. If only optical tube assembly 10 was being manufactured during this process, reel 78 would collect the same. However, if optical tube assembly 10 was manufactured into fiber optic cable 50 on the same line the manufacturing steps illustrated in dashed box 70 are performed. Specifically, a plurality of strength members 54 and tensile strength components 56 are respectively paid off reels 72 and 74. Although, fiber optic cable 50 includes a plurality of strength members 54 and tensile strength components 56 for the sake of simplicity only one each is illustrated. Thereafter, optical tube assembly 10, strength members 54 and tensile strength components 56 are fed into a cross-head extruder 76 for forming jacket 58. Next, the completed cable 50 passes through a second water trough (not numbered) before being wound on reel 78. Additionally, various other fiber optic cables can be manufactured using the concepts of the present invention.

Figure 7:
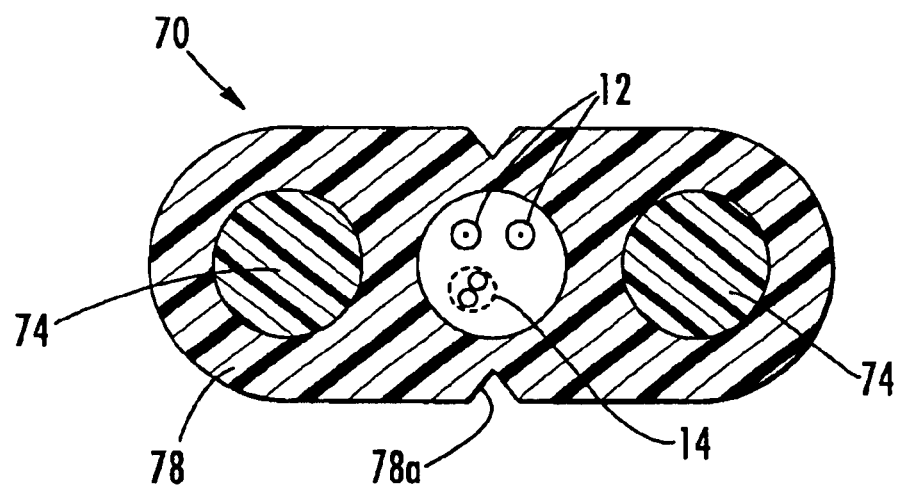
FIG. 7 is a cross-sectional view of yet another fiber optic cable according to the concepts of the present invention.

Additionally, other embodiments employing the concepts of the present are possible. For instance, FIG. 7 depicts fiber optic cable 70 having at least one optical waveguide 12, at least one water-swellable yarn, a plurality of strength members 74, and a jacket 78. In this embodiment, the longitudinal cavity housing the at least one optical waveguide and the at least one water-swellable yarn is formed by jacket 78. In other words, cable 70 is a tubeless configuration. Additionally, jacket 78 optionally includes at least one notch 78a as a preferential tear portion for accessing the longitudinal cavity within jacket 78. Of course, other embodiments are also possible such as tensile strength members in addition to or replacing strength members 74. Moreover, flat cables such as cable 70 may also include a messenger section attached to an end of the jacket.

Many modifications and other embodiments of the present invention, within the scope of the appended claims, will become apparent to a skilled artisan. For example, optical waveguides can have a variety of configurations. Additionally, fiber optic cables according to the present invention can also include more than one optical tube assembly stranded helically or in S–Z configurations. Therefore, it is to be understood that the invention is not limited to the specific embodiments disclosed herein and that modifications and other embodiments may be made within the scope of the appended claims. Although specific terms are employed herein, they are used in a generic and descriptive sense only and not for purposes of limitation. The invention has been described with reference to silica-based optical waveguides, but the inventive concepts of the present invention are applicable to other suitable optical waveguides and/or fiber optic cable configurations.

That which is claimed:

1. A fiber optic cable comprising:
at least one optical waveguide, wherein the at least one optical waveguide has a predetermined length; and
at least one water-swellable yarn, the at least one water-swellable yarn having a predetermined length, the predetermined length of the at least one water-swellable yarn being greater than the predetermined length of the at least one optical waveguide, wherein the at least one water-swellable yarn is disposed longitudinally relative to the at least one optical waveguide so that the at least one water-swellable yarn and the at least one optical waveguide generally act as independent bodies within a common longitudinal cavity.

2. The fiber optic cable according to claim 1, the predetermined length of the at least one water-swellable yarn being at least about 0.05% longer than the predetermined length of the at least one optical waveguide.

3. The fiber optic cable according to claim 1, the predetermined length of the at least one water-swellable yarn being at least about 0.1% longer than the predetermined length of the at least one optical waveguide.

4. The fiber optic cable according to claim 1, the at least one water-swellable yarn has a denier of about 5000 or less and comprises at least two filaments that are stranded together, and at least one of the two filaments being a water-swellable filament.

5. The fiber optic cable according to claim 1, the at least one water-swellable yarn has a denier of about 2500 or less and comprises at least two filaments that are stranded together with about ten TPI or less during a no-load condition, and at least one of the at least two filaments being a water-swellable filament.

6. The fiber optic cable according to claim 1, further comprising a lubricant on a portion of the at least one optical waveguide.

7. The fiber optic cable according to claim 1, further comprising a silicone oil on a portion of the at least one optical waveguide.

8. The fiber optic cable according to claim 1, the at least one optical waveguide being a portion of a fiber optic ribbon, the fiber optic ribbon having a predetermined ribbon length that is less than the predetermined length of the at least one water-swellable yarn.

9. The fiber optic cable according to claim 1, further comprising a tube, the tube being the common longitudinal cavity.

10. An optical tube assembly comprising:
a tube;
at least one optical waveguide, the optical waveguide being disposed in the tube, wherein the at least one optical waveguide has a predetermined length; and at least one water-swellable yarn, the at least one water-swellable yarn being disposed within the tube and having a predetermined length, the predetermined length of the at least one water-swellable yarn being greater than the predetermined length of the at least one optical waveguide, wherein the at least one water-swellable yarn is disposed longitudinally relative to the at least one optical waveguide so that the at least one water-swellable yarn and the at least one optical waveguide generally act as independent bodies within the tube.

11. The optical tube assembly according to claim 10, the predetermined length of the at least one water-swellable yarn being at least about 0.05% longer than the predetermined length of the at least one optical waveguide.

12. The optical tube assembly according to claim 10, the predetermined length of the at least one water-swellable yarn being at least about 0.1% longer than the predetermined length of the at least one optical waveguide.

13. The optical tube assembly according to claim 10, the at least one water-swellable yarn has a denier of about 5000 or less and comprises at least two filaments that are stranded together, and at least one of the two filaments being a water-swellable filament.

14. The optical tube assembly according to claim 10, the at least one water-swellable yarn has a denier of about 2500 or less and comprises at least two filaments that are stranded together with about ten TPI or less during a no-load condition, and at least one of the at least two filaments being a water-swellable filament.

15. The optical tube assembly according to claim 10, the at least one optical waveguide having an excess length compared with a length of the tube.

16. The optical tube assembly according to claim 10, further comprising a lubricant on a portion of the at least one optical waveguide.

17. The optical tube assembly according to claim 10, further comprising a silicone oil on a portion of the at least one optical waveguide.

18. The optical tube assembly according to claim 10, the at least one optical waveguide being a portion of a fiber optic ribbon, the fiber optic ribbon having a predetermined ribbon length that is less than the predetermined length of the at least one water-swellable yarn.

19. The optical tube assembly according to claim 10, the optical tube assembly being a portion of a cable.

20. The optical tube assembly according to claim 10, the optical tube assembly being a portion of a cable, wherein the optical tube assembly is stranded about a central member.

21. The optical tube assembly according to claim 10, the optical tube assembly being a portion of a figure eight cable.

22. An optical tube assembly comprising:
a tube;
at least one optical waveguide, the optical waveguide being disposed in the tube, wherein the at least one optical waveguide has a predetermined length;
a lubricant, the lubricant being disposed on a portion of the at least one optical waveguide; and
at least one water-swellable yarn, the at least one water-swellable yarn being disposed within the tube and having a predetermined length, the predetermined length of the at least one water-swellable yarn being at least about 0.05% longer than the predetermined length of the at least one optical waveguide, wherein the at least one water-swellable yarn is disposed longitudinally relative to the at least one optical waveguide so that the at least one water-swellable yarn and the at least one optical waveguide generally act as independent bodies within the tube.

23. The optical tube assembly according to claim 22, the predetermined length of the at least one water-swellable yarn being at least about 0.1% longer than the predetermined length of the at least one optical waveguide.

24. The optical tube assembly according to claim 22, the at least one water-swellable yarn has a denier of about 5000 or less and comprises at least two filaments that are stranded together, and at least one of the at least two filaments being a water-swellable filament.

25. The optical tube assembly according to claim 22, the at least one water-swellable yarn has a denier of about 2500 or less and comprises at least two filaments that are stranded together with about ten TPI or less during a no-load condition, and at least one of the at least two filaments being a water-swellable filament.

26. The optical tube assembly according to claim 22, the at least one optical waveguide having an excess length compared with a length of the tube.

27. The optical tube assembly according to claim 22, the lubricant being a silicone oil.

28. The optical tube assembly according to claim 22, the at least one optical waveguide being a portion of a fiber optic ribbon, the fiber optic ribbon having a predetermined ribbon length that is less than the predetermined length of the at least one water-swellable yarn.

29. The optical tube assembly according to claim 22, the optical tube assembly being a portion of a cable.

30. The optical tube assembly according to claim 22, the optical tube assembly being a portion of a cable, wherein the optical tube assembly is stranded about a central member.

31. The optical tube assembly according to claim 22, the optical tube assembly being a portion of a figure eight cable.

32. A fiber optic cable comprising:
a central member;
a tube, the tube being stranded about the central member;
at least one optical waveguide, the optical waveguide being disposed in the tube, wherein the at least one optical waveguide has a predetermined length; and
at least one water-swellable yarn, the at least one water-swellable yarn being disposed within the tube and having a predetermined length, the predetermined length of the at least one water-swellable yarn being greater than the predetermined length of the at least one optical waveguide, wherein the at least one water-swellable yarn is disposed longitudinally relative to the at least one optical waveguide so that the at least one water-swellable yarn and the at least one optical waveguide generally act as independent bodies within the tube.

33. The fiber optic cable according to claim 32, the predetermined length of the at least one water-swellable yarn being at least about 0.05% longer than the predetermined length of the at least one optical waveguide.

34. The fiber optic cable according to claim 32, the predetermined length of the at least one water-swellable yarn being about 0.1% longer than the predetermined length of the at least one optical waveguide.

35. The fiber optic cable according to claim 32, the at least one water-swellable yarn has a denier of about 5000 or less and comprises at least two filaments that are stranded together, and at least one of the at least two filaments being a water-swellable filament.

36. The fiber optic cable according to claim 32, the at least one water-swellable yarn has a denier of about 2500 or less and comprises at least two filaments that are stranded together with about ten TPI or less during a no-load condition, and at least one of the at least two filaments being a water-swellable filament.

37. The fiber optic cable according to claim 32, the at least one optical waveguide having an excess length compared with a length of the tube.

38. The fiber optic cable according to claim 32, further comprising a lubricant on a portion of the at least one optical waveguide.

39. The fiber optic cable according to claim 32, further comprising a silicone oil on a portion of the at least one optical waveguide.

40. The fiber optic cable according to claim 32, the at least one optical waveguide being a portion of a fiber optic ribbon, the fiber optic ribbon having a predetermined ribbon length that is less than the predetermined length of the at least one water-swellable yarn.

41. The fiber optic cable according to claim 32, further comprising a jacket, the jacket being flame-retardant.

42. A method of making a fiber optic tube assembly, comprising the steps of:
   paying off at least one optical waveguide, the optical waveguide having a predetermined length;
   paying off at least one water-swellable yarn, the optical waveguide having a predetermined length;
   maintaining the predetermined length of the at least one water-swellable yarn so that its predetermined length is greater than the predetermined length of the at least one optical waveguide; and
   extruding a tube about the at least one optical waveguide and the at least one water-swellable yarn, wherein the at least one water-swellable yarn is disposed longitudinally relative to the at least one optical waveguide so that the at least one water-swellable yarn and the at least one optical waveguide are able to act as independent bodies within the tube.

43. The method according to claim 42, further comprising maintaining the predetermined length of the at least water-swellable yarn at least about 0.05% longer than the predetermined length of the at least one optical waveguide.

44. The method according to claim 42, further comprising maintaining the predetermined length of the at least water-swellable yarn at least about 0.1% longer than the predetermined length of the at least ore optical waveguide.

45. The method according to claim 42, further comprising the step of applying a lubricant on a portion of the at least one optical waveguide.

46. The method according to claim 42, further comprising extruding a jacket about the fiber optic tube assembly, thereby forming a fiber optic cable.

47. A fiber optic cable comprising:
   at least one optical waveguide;
   a lubricant, the lubricant being disposed on a portion of the at least one optical waveguide; and
   at least one water-swellable yarn, the at least one water-swellable yarn has a denier of about 5000 or less and comprises at least two filaments that are stranded together, and at least one of the two filaments being a water-swellable filament, wherein the at least one water-swellable yarn is disposed longitudinally relative to the at least one optical waveguide so that the at least one water-swellable yarn and the at least one optical waveguide generally act as independent bodies within a common longitudinal cavity.

48. The fiber optic cable according to claim 47, the at least one optical waveguide having a predetermined length and the at least one water-swellable yarn having a predetermined length, wherein the predetermined length of the at least one water-swellable yarn is greater than the predetermined length of the at least one optical waveguide.

49. The fiber optic cable according to claim 48, the predetermined length of the at least one water-swellable yarn being at least about 0.05% longer than the predetermined length of the at least one optical waveguide.

50. The fiber optic cable according to claim 48, the predetermined length of the at least one water-swellable yarn being at least about 0.1% longer than the predetermined length of the at least one optical waveguide.

51. The fiber optic cable according to claim 47, the at least one water-swellable yarn has a denier of about 2500 or less.

52. The fiber optic cable according to claim 47, the lubricant being a silicone oil.

* * * * *